(12) United States Patent
Hunter et al.

(10) Patent No.: US 10,087,984 B2
(45) Date of Patent: Oct. 2, 2018

(54) PLAIN BEARING

(71) Applicant: SAINT-GOBAIN PERFORMANCE PLASTICS CORPORATION, Solon, OH (US)

(72) Inventors: Alan F. Hunter, Nutley, NJ (US); Zbigniew M. Koziol, Clifton, NJ (US); Nicholas F. Witting, Clark, NJ (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/193,703

(22) Filed: Jun. 27, 2016

(65) Prior Publication Data

US 2017/0002858 A1 Jan. 5, 2017

Related U.S. Application Data

(60) Provisional application No. 62/186,903, filed on Jun. 30, 2015.

(51) Int. Cl.
| | | |
|---|---|---|
| *F16C 17/10* | (2006.01) | |
| *F16C 33/04* | (2006.01) | |
| *F16C 33/20* | (2006.01) | |
| *F16C 17/02* | (2006.01) | |

(52) U.S. Cl.
CPC .............. *F16C 17/10* (2013.01); *F16C 17/02* (2013.01); *F16C 33/046* (2013.01); *F16C 33/208* (2013.01); *F16C 33/201* (2013.01); *F16C 33/203* (2013.01); *F16C 2202/50* (2013.01);

(Continued)

(58) Field of Classification Search
CPC .......... F16C 17/02; F16C 17/10; F16C 17/12; F16C 33/02; F16C 33/203; F16C 33/205; F16C 33/206; F16C 33/208; F16C 33/046; F16C 33/14; F16C 33/201; F16C 2220/42;
(Continued)

(56) References Cited

U.S. PATENT DOCUMENTS

| | | |
|---|---|---|
| 3,786 A | 10/1844 | Loner |
| 11,510 A | 8/1854 | Taylor |
| 45,300 A | 11/1864 | Sampson |

(Continued)

FOREIGN PATENT DOCUMENTS

| | | |
|---|---|---|
| AU | 706949 B2 | 7/1999 |
| AU | 2007308459 A1 | 5/2008 |

(Continued)

OTHER PUBLICATIONS

Translation of DE 2529496 dated Jan. 1977 (Year: 1977).*
International Search Report for PCT/US2016/039567, dated Sep. 12, 2016, 1 page.

*Primary Examiner* — Alan B Waits
(74) *Attorney, Agent, or Firm* — Abel Law Group, LLP; Chi Suk Kim

(57) ABSTRACT

A plain bearing comprising a generally cylindrical sidewall having a first axial end and a second axial end; and a curved portion disposed at the first axial end, wherein the generally cylindrical sidewall has a thickness, wherein the curved portion has an effective material thickness, wherein the effective material thickness of the curved portion is n-times thicker than the thickness of the generally cylindrical sidewall, and wherein n equals 2, 3, 4, or even 5.

13 Claims, 3 Drawing Sheets

(52) U.S. Cl.
CPC ...... *F16C 2220/42* (2013.01); *F16C 2240/60* (2013.01)

(58) Field of Classification Search
CPC .. F16C 2240/60; F16C 2202/50; B21D 19/14; B21D 19/16
USPC .............. 16/2.1–2.5, 108, 109; 29/898.054, 29/898.056, 898.057, 898.058, 898.059
See application file for complete search history.

(56) References Cited

U.S. PATENT DOCUMENTS

| | | | |
|---|---|---|---|
| 73,183 A | 1/1868 | Henfield | |
| 99,711 A | 2/1870 | Robinett | |
| 235,435 A | 12/1880 | Hopkins | |
| 503,910 A | 8/1893 | Merry | |
| 528,278 A | 10/1894 | Roberts | |
| 536,048 A | 3/1895 | Schofield | |
| 565,243 A | 8/1896 | Taylor | |
| 648,461 A | 5/1900 | Jacobs | |
| 688,431 A * | 12/1901 | Neubert | F16L 5/00 16/2.1 |
| 715,006 A | 12/1902 | Bomgren | |
| 742,456 A | 10/1903 | Laub | |
| 863,089 A | 8/1907 | Powell | |
| 949,910 A | 2/1910 | Perkins | |
| 1,005,954 A | 10/1911 | Fritz | |
| 1,143,958 A | 6/1915 | Harrington et al. | |
| 1,156,582 A | 10/1915 | Biggar | |
| 1,213,684 A | 1/1917 | Osterholm | |
| 1,231,670 A | 7/1917 | Tidlund | |
| 1,302,564 A | 5/1919 | Klocke | |
| 1,332,395 A | 3/1920 | Hachmann | |
| 1,333,336 A | 3/1920 | Pack et al. | |
| 1,333,337 A | 3/1920 | Pack et al. | |
| 1,395,913 A | 11/1921 | Ford | |
| 1,420,033 A | 6/1922 | Greve | |
| 1,426,173 A | 8/1922 | Fuegel et al. | |
| 1,466,137 A | 8/1923 | Mead | |
| 1,470,645 A | 10/1923 | Roberts | |
| 1,480,298 A * | 1/1924 | Pearson | H04B 1/08 16/2.1 |
| 1,481,217 A * | 1/1924 | Maloy | A43C 5/00 16/2.1 |
| 1,498,598 A | 6/1924 | Williams | |
| 1,603,022 A | 10/1926 | Briney | |
| 1,636,100 A | 7/1927 | McCune | |
| 1,647,387 A | 11/1927 | Wood | |
| 1,647,523 A | 11/1927 | Hunt | |
| 1,652,468 A | 12/1927 | Catlin | |
| 1,681,906 A | 8/1928 | Taylor, Jr. | |
| 1,684,405 A | 9/1928 | McWhirter | |
| 1,693,333 A | 11/1928 | Barrett | |
| 1,700,100 A | 1/1929 | Smith | |
| 1,715,359 A | 6/1929 | Hansen | |
| 1,731,758 A | 10/1929 | Viden | |
| 1,738,037 A | 12/1929 | Collins | |
| 1,758,712 A | 5/1930 | Morris | |
| 1,762,181 A | 6/1930 | Marles | |
| 1,809,309 A | 6/1931 | Olander | |
| 1,814,762 A | 7/1931 | Mochel | |
| 1,815,344 A | 7/1931 | Brincil | |
| 1,849,963 A | 3/1932 | Snow | |
| 1,851,934 A | 3/1932 | Stockfleth | |
| 1,859,608 A | 5/1932 | Vigne | |
| 1,862,279 A | 6/1932 | Sandler | |
| 1,864,707 A | 6/1932 | Alden | |
| 1,870,867 A | 8/1932 | Pike et al. | |
| 1,872,600 A | 8/1932 | Manning | |
| 1,900,617 A | 3/1933 | Ricardo | |
| 1,910,300 A | 5/1933 | Marles | |
| 1,922,304 A | 8/1933 | Klocke | |
| 1,937,840 A | 12/1933 | Pike et al. | |
| 1,977,335 A | 10/1934 | Brophy et al. | |
| 2,191,528 A | 2/1940 | Hewel | |
| 2,209,274 A * | 7/1940 | Jaberg | H02G 3/06 138/96 R |
| 2,250,753 A | 7/1941 | Dieckmann | |
| 2,255,971 A | 9/1941 | Hall | |
| 2,274,372 A | 2/1942 | Leighton | |
| 2,398,786 A | 4/1946 | Hanks | |
| 2,419,691 A | 4/1947 | Shafer | |
| 2,448,147 A | 8/1948 | Jacobsen | |
| 2,462,543 A * | 2/1949 | Palmer | A63D 5/08 16/2.1 |
| 2,465,329 A | 3/1949 | Murray | |
| 2,478,037 A | 8/1949 | Brennan | |
| 2,480,043 A | 8/1949 | Paulus et al. | |
| 2,532,092 A | 11/1950 | Frangquist | |
| 2,666,677 A | 1/1954 | Miller | |
| 2,713,525 A | 7/1955 | Hinman | |
| 2,739,852 A | 3/1956 | Levy | |
| 2,801,948 A * | 8/1957 | Walker | A41H 37/001 156/216 |
| 2,901,800 A * | 9/1959 | Koehl | F16L 319/10 16/2.1 |
| 2,907,594 A | 10/1959 | Macks | |
| 2,937,414 A | 5/1960 | Cotchett | |
| 2,989,354 A | 6/1961 | Merriman | |
| 2,997,252 A * | 8/1961 | Sibille | B65H 75/14 242/118.3 |
| 3,022,126 A | 2/1962 | Siebert | |
| 3,028,056 A | 4/1962 | Silver | |
| 3,065,035 A | 11/1962 | Biesecker | |
| 3,089,208 A | 5/1963 | Scribner | |
| 3,104,136 A | 9/1963 | Merriman | |
| 3,193,335 A | 7/1965 | Wing | |
| 3,268,278 A | 8/1966 | Purdy | |
| 3,311,432 A | 3/1967 | Cowles | |
| 3,361,501 A | 1/1968 | Messinger et al. | |
| 3,438,686 A | 4/1969 | Stone | |
| 3,447,849 A | 6/1969 | Harris et al. | |
| 3,471,206 A | 10/1969 | Hillander | |
| 3,584,923 A | 6/1971 | Goossens | |
| 3,751,122 A | 8/1973 | Dubay | |
| 3,801,209 A | 4/1974 | Matsuoka | |
| 3,802,285 A | 4/1974 | Williams | |
| 3,857,433 A | 12/1974 | Gaetzi | |
| 3,874,752 A | 4/1975 | Imazaike | |
| 3,953,089 A | 4/1976 | Dainin | |
| 3,990,800 A | 11/1976 | Graff | |
| 4,081,204 A | 3/1978 | Bauer et al. | |
| 4,121,742 A | 10/1978 | Biricz et al. | |
| 4,134,175 A | 1/1979 | Contoyanis | |
| 4,173,928 A | 11/1979 | Mitter | |
| 4,270,415 A | 6/1981 | Dickinson et al. | |
| 4,361,021 A | 11/1982 | McVay et al. | |
| 4,428,689 A | 1/1984 | Choate | |
| 4,447,192 A | 5/1984 | Tuckey | |
| 4,477,197 A | 10/1984 | Choate | |
| 4,479,287 A * | 10/1984 | Asaka | A41H 37/001 114/114 |
| 4,498,790 A | 2/1985 | Fisher | |
| 4,509,290 A | 4/1985 | Stanfield, Jr. | |
| 4,509,870 A | 4/1985 | Taki | |
| 4,533,261 A | 8/1985 | Losio | |
| 4,541,305 A | 9/1985 | Hamabe et al. | |
| 4,553,328 A | 11/1985 | Buscher | |
| 4,561,326 A | 12/1985 | Hamabe et al. | |
| 4,592,389 A | 6/1986 | Yamada et al. | |
| 4,621,932 A | 11/1986 | Kuefner et al. | |
| 4,624,585 A | 11/1986 | Nix et al. | |
| 4,626,112 A | 12/1986 | Kramer | |
| 4,645,430 A | 2/1987 | Carleton | |
| 4,746,270 A | 5/1988 | Hale et al. | |
| 4,750,878 A | 6/1988 | Nix et al. | |
| 4,765,674 A | 8/1988 | Svensson | |
| 4,775,249 A | 10/1988 | Roemer et al. | |
| 4,783,608 A | 11/1988 | Gruber et al. | |
| 4,790,672 A | 12/1988 | Komplin | |
| 4,796,457 A | 1/1989 | Iijima | |
| 4,806,024 A | 2/1989 | Tanaka et al. | |
| 4,846,590 A | 7/1989 | Teramachi | |
| 4,853,572 A | 8/1989 | Morrill | |

(56) References Cited

U.S. PATENT DOCUMENTS

| | | |
|---|---|---|
| 4,887,331 A | 12/1989 | Thomas |
| 4,896,368 A | 1/1990 | Just |
| 4,898,479 A | 2/1990 | Simmons |
| 4,899,432 A | 2/1990 | Adam et al. |
| 4,909,639 A | 3/1990 | Belanger |
| 4,913,562 A | 4/1990 | Rosen |
| 4,917,509 A | 4/1990 | Takano |
| 4,974,972 A | 12/1990 | Boosler, Jr. et al. |
| 5,014,392 A | 5/1991 | Melara |
| 5,015,104 A | 5/1991 | Sato |
| 5,062,718 A | 11/1991 | Lenhard-Backhaus et al. |
| 5,099,707 A | 3/1992 | Tori et al. |
| 5,107,716 A | 4/1992 | Torii et al. |
| 5,125,756 A | 6/1992 | Bossler, Jr. |
| 5,129,687 A | 7/1992 | Scheidel et al. |
| 5,145,265 A | 9/1992 | Flem |
| 5,146,805 A | 9/1992 | Harkrader et al. |
| 5,149,006 A | 9/1992 | Hitomi |
| 5,177,869 A | 1/1993 | Andersson |
| 5,181,784 A | 1/1993 | Joerdens et al. |
| 5,188,272 A | 2/1993 | Kanbe et al. |
| 5,192,137 A | 3/1993 | Renard |
| 5,193,916 A | 3/1993 | Andersson |
| 5,211,485 A | 5/1993 | Hoshino |
| 5,216,928 A | 6/1993 | Kodachi |
| 5,219,231 A | 6/1993 | Sheedy |
| 5,230,569 A | 7/1993 | Sheedy |
| 5,232,056 A | 8/1993 | Long et al. |
| 5,251,986 A * | 10/1993 | Arena ................ F16C 11/045 384/208 |
| 5,263,778 A | 11/1993 | Joerdens et al. |
| 5,271,476 A | 12/1993 | Minamibata |
| 5,280,138 A * | 1/1994 | Preston ................ B65H 57/10 16/2.1 |
| 5,281,034 A | 1/1994 | Hertlein |
| 5,288,152 A | 2/1994 | Davies |
| 5,299,677 A | 4/1994 | Caillaud et al. |
| 5,330,273 A | 7/1994 | Tsai |
| 5,358,340 A | 10/1994 | Bober |
| 5,363,717 A | 11/1994 | Eichholz et al. |
| 5,385,422 A | 1/1995 | Kruger |
| 5,402,696 A | 4/1995 | Hecht et al. |
| 5,409,242 A | 4/1995 | Gonnocci |
| 5,414,934 A | 5/1995 | Schlessmann |
| 5,435,650 A | 7/1995 | Emig et al. |
| 5,439,295 A | 8/1995 | Mikolaizik |
| 5,460,454 A | 10/1995 | Renoux |
| 5,463,795 A * | 11/1995 | Carlson ................ E05D 5/14 16/273 |
| 5,492,415 A | 2/1996 | Joerdens et al. |
| 5,511,885 A | 4/1996 | Coleman |
| 5,512,968 A | 4/1996 | Hagiwara et al. |
| 5,520,466 A | 5/1996 | Everitt et al. |
| 5,562,347 A | 10/1996 | Hsieh |
| 5,564,838 A | 10/1996 | Caillault et al. |
| 5,570,766 A | 11/1996 | Sato et al. |
| 5,577,295 A * | 11/1996 | Papke ................ E05D 5/128 16/254 |
| 5,577,843 A | 11/1996 | Leininger et al. |
| 5,595,443 A | 1/1997 | Prillwitz |
| 5,599,056 A | 2/1997 | Schmitt |
| 5,644,180 A | 7/1997 | Buchanan, Jr. |
| 5,669,718 A | 9/1997 | Sakairi et al. |
| 5,676,469 A | 10/1997 | Sandy et al. |
| 5,688,054 A | 11/1997 | Rabe |
| 5,704,717 A | 1/1998 | Cochimin |
| 5,713,672 A | 2/1998 | Lu |
| 5,735,611 A | 4/1998 | Godesa |
| 5,798,155 A | 8/1998 | Yanagawa et al. |
| 5,819,146 A | 10/1998 | Roderick |
| 5,820,270 A | 10/1998 | Richardson |
| 5,829,317 A | 11/1998 | Vreeken et al. |
| 5,839,042 A | 11/1998 | Tomatsu |
| 5,846,173 A | 12/1998 | Grabscheid et al. |
| 5,885,006 A | 3/1999 | Sheedy |
| 5,887,983 A | 3/1999 | Gulian et al. |
| 5,926,680 A | 7/1999 | Yamamoto et al. |
| 5,927,862 A | 7/1999 | Debnam et al. |
| 5,941,647 A | 8/1999 | Koike et al. |
| 5,947,496 A | 9/1999 | Kraft et al. |
| 5,980,112 A | 11/1999 | Matthews |
| 5,988,981 A | 11/1999 | Dehrmann et al. |
| 3,012,538 A | 1/2000 | Sonobe et al. |
| 6,056,443 A | 5/2000 | Koike et al. |
| 6,070,870 A | 6/2000 | Gramlich et al. |
| 6,089,484 A | 7/2000 | Zwayer et al. |
| 6,099,061 A | 8/2000 | Gessay |
| 6,099,166 A | 8/2000 | Erikson et al. |
| 6,113,275 A | 9/2000 | Blase |
| 6,126,356 A | 10/2000 | Russell |
| 6,149,309 A | 11/2000 | Wojtkowski, Jr. et al. |
| 6,170,990 B1 * | 1/2001 | Hawkins ................ F16C 33/16 384/276 |
| 6,231,239 B1 | 5/2001 | Damour et al. |
| 6,238,094 B1 | 5/2001 | Schabanel et al. |
| 6,280,091 B1 | 8/2001 | Martin et al. |
| 6,289,706 B1 | 9/2001 | Hermanson |
| 6,314,649 B1 | 11/2001 | Linsbauer |
| 6,315,703 B1 | 11/2001 | Quack et al. |
| 6,342,992 B1 | 1/2002 | Prater et al. |
| 6,364,076 B1 | 4/2002 | Braun et al. |
| 6,367,982 B1 | 4/2002 | Doi et al. |
| 6,474,869 B1 | 11/2002 | Sommerfeld et al. |
| 6,511,227 B1 | 1/2003 | Siow et al. |
| 6,546,825 B1 | 4/2003 | Kugle |
| 6,588,047 B2 | 7/2003 | Burkard et al. |
| 6,609,299 B2 | 8/2003 | Adachi |
| 6,648,512 B1 * | 11/2003 | Storch ................ E05D 5/127 384/275 |
| 6,669,370 B1 | 12/2003 | Storch et al. |
| 6,685,360 B2 | 2/2004 | Murphy et al. |
| 6,698,932 B2 | 3/2004 | Hamaguchi et al. |
| 6,702,468 B2 | 3/2004 | Rennett |
| 6,705,148 B1 | 3/2004 | McCorry et al. |
| 6,708,625 B1 | 3/2004 | Burke et al. |
| 6,727,616 B1 | 4/2004 | Gabrys et al. |
| 6,729,764 B2 | 5/2004 | Kobayashi et al. |
| 6,746,155 B2 | 6/2004 | Chen |
| 6,777,636 B2 | 8/2004 | Ahlert et al. |
| 6,799,894 B2 | 10/2004 | Fidziukiewicz |
| 6,851,702 B2 | 2/2005 | Henderson et al. |
| 6,907,647 B2 * | 6/2005 | Kopatz ................ A41H 37/02 227/15 |
| 6,925,674 B2 | 8/2005 | Prince et al. |
| 6,974,108 B2 | 12/2005 | Fondriest |
| 6,997,101 B2 | 2/2006 | Lyu |
| 7,029,180 B2 | 4/2006 | Checketts et al. |
| 7,210,852 B2 | 5/2007 | Leimann |
| 7,220,056 B2 | 5/2007 | Kubota et al. |
| 7,287,407 B2 | 10/2007 | Stout, Jr. et al. |
| 7,354,212 B2 | 4/2008 | Sawai |
| 7,360,990 B2 | 4/2008 | Barbe et al. |
| 7,422,840 B2 | 9/2008 | Dudek et al. |
| 7,465,099 B2 | 12/2008 | Connell et al. |
| 7,469,566 B2 | 12/2008 | Heimann |
| 7,552,536 B2 | 6/2009 | Leimann |
| 7,611,150 B2 | 11/2009 | Roeingh et al. |
| 7,665,747 B2 | 2/2010 | Arlt |
| 7,686,515 B2 | 3/2010 | Schust |
| 7,689,139 B2 | 3/2010 | Kamimura |
| 7,721,419 B2 | 5/2010 | Leimann |
| 7,722,018 B2 | 5/2010 | Meyerboeck et al. |
| 7,736,066 B2 | 6/2010 | Liu et al. |
| 8,016,490 B2 | 9/2011 | Hosoya et al. |
| 8,084,905 B2 | 12/2011 | Bhatti |
| 8,106,369 B2 | 1/2012 | Drenter |
| 8,141,248 B2 | 3/2012 | de Andrade Filho et al. |
| 8,152,379 B2 | 4/2012 | Takeuchi |
| 8,205,515 B2 | 6/2012 | Robertson et al. |
| 8,272,785 B2 | 9/2012 | Hirose et al. |
| 8,274,187 B2 | 9/2012 | Kim et al. |
| 8,308,373 B2 | 11/2012 | Miyachi et al. |
| 8,342,092 B2 | 1/2013 | Kasper et al. |
| 8,359,975 B2 | 1/2013 | McMillen et al. |

(56) References Cited

U.S. PATENT DOCUMENTS

| | | |
|---|---|---|
| 8,371,755 B2 | 2/2013 | Swartzentruber |
| 8,376,617 B2 | 2/2013 | Schroeder et al. |
| 8,408,800 B2 | 4/2013 | Hagan |
| 8,418,670 B2 | 4/2013 | Abe et al. |
| 8,459,873 B2 | 6/2013 | Liu et al. |
| 8,506,169 B2 | 8/2013 | Nakagawa |
| 8,529,319 B2 | 9/2013 | Gaspich et al. |
| 8,550,720 B2 | 10/2013 | Horng et al. |
| 8,568,114 B2 | 10/2013 | Masuda et al. |
| 8,585,294 B2 | 11/2013 | Drigani et al. |
| 8,615,775 B2 | 12/2013 | Smirnov et al. |
| 8,641,285 B2 | 2/2014 | Roessler |
| 8,689,390 B2 | 4/2014 | Motono et al. |
| 8,756,787 B2 | 6/2014 | Zimmermann et al. |
| 8,834,030 B2 | 9/2014 | Nakagawa |
| 8,834,031 B2 | 9/2014 | Korn |
| 8,845,195 B2 | 9/2014 | Gaisser |
| 8,899,837 B2 | 12/2014 | Kaneko et al. |
| 8,942,609 B2 | 1/2015 | Hata |
| 8,967,869 B2 | 3/2015 | Schneider |
| 8,979,376 B2 | 3/2015 | Angenheister |
| 9,022,656 B2 * | 5/2015 | Burgeff ................ F16C 27/063 384/276 |
| 2001/0033703 A1 | 10/2001 | Martin |
| 2003/0031390 A1 | 2/2003 | Ericksen et al. |
| 2003/0233721 A1 | 12/2003 | Prince et al. |
| 2004/0136632 A1 | 7/2004 | Leimann |
| 2005/0191001 A1 | 9/2005 | Fidziukiewicz |
| 2006/0104675 A1 | 5/2006 | Dudek et al. |
| 2006/0117567 A1 | 6/2006 | Leimann |
| 2007/0071481 A1 | 3/2007 | Kamimura |
| 2007/0251284 A1 | 11/2007 | Heimann |
| 2007/0283739 A1 | 12/2007 | Kirchhof et al. |
| 2007/0297705 A1 | 12/2007 | Hosoya et al. |
| 2008/0247692 A1 | 10/2008 | Schroeder |
| 2008/0247693 A1 | 10/2008 | Schroeder et al. |
| 2008/0304782 A1 | 12/2008 | Leimann |
| 2009/0034897 A1 | 2/2009 | Liu et al. |
| 2009/0041397 A1 | 2/2009 | Swartzentruber |
| 2009/0087128 A1 | 4/2009 | Waseda |
| 2009/0110338 A1 | 4/2009 | Blase et al. |
| 2009/0199733 A1 | 8/2009 | Dudek et al. |
| 2009/0288569 A1 | 11/2009 | McMillen et al. |
| 2010/0002970 A1 * | 1/2010 | Schmidt ................ F16C 17/10 384/231 |
| 2010/0065010 A1 | 3/2010 | Abe |
| 2010/0126366 A1 | 5/2010 | Kasper et al. |
| 2010/0188941 A1 | 7/2010 | Fujieda |
| 2010/0230618 A1 | 9/2010 | Drenter |
| 2011/0002565 A1 * | 1/2011 | Ambroise ................ F16C 17/10 384/222 |
| 2011/0002572 A1 | 1/2011 | Miyachi et al. |
| 2011/0162685 A1 | 7/2011 | Weiden et al. |
| 2011/0262064 A1 | 10/2011 | Burgeff et al. |
| 2012/0080322 A1 | 4/2012 | Kunze |
| 2012/0111365 A1 | 5/2012 | Kunze et al. |
| 2012/0275733 A1 | 11/2012 | Kastinger et al. |
| 2013/0020902 A1 | 1/2013 | Sato |
| 2013/0087058 A1 | 4/2013 | Kasper et al. |
| 2013/0259545 A1 | 10/2013 | Hata |
| 2014/0023304 A1 | 1/2014 | Charles et al. |
| 2014/0199008 A1 | 7/2014 | Swartzentruber |
| 2014/0294469 A1 | 10/2014 | Okuma et al. |
| 2015/0137508 A1 * | 5/2015 | Lehr ........................ F01N 13/10 285/145.4 |
| 2016/0061270 A1 * | 3/2016 | James ................... F16D 1/0835 16/2.5 |
| 2017/0227047 A1 * | 8/2017 | Fujiwara ................. F16C 17/10 |

FOREIGN PATENT DOCUMENTS

| | | | |
|---|---|---|---|
| AU | 2007308459 B2 | 7/2010 | |
| CN | 1558994 A | 12/2004 | |
| CN | 100335804 C | 9/2007 | |
| DE | 2529496 A * | 1/1977 | |
| DE | 102008058596 A1 * | 5/2010 | ............ F16C 17/10 |
| EP | 0328496 B2 | 1/1996 | |
| EP | 0832816 A1 | 4/1998 | |
| EP | 980747 A2 | 2/2000 | |
| EP | 1370780 A2 | 12/2003 | |
| EP | 1657593 A2 | 5/2006 | |
| EP | 1370780 B1 | 8/2006 | |
| EP | 1768001 A2 | 3/2007 | |
| EP | 1847727 A1 | 10/2007 | |
| EP | 2060808 A1 | 5/2009 | |
| EP | 2124105 A2 | 11/2009 | |
| EP | 2253860 A1 | 11/2010 | |
| EP | 2365909 A1 | 9/2011 | |
| EP | 2406422 A2 | 1/2012 | |
| EP | 2060808 B1 | 10/2012 | |
| EP | 2124105 B1 | 12/2012 | |
| EP | 1847727 B1 | 1/2013 | |
| EP | 2573905 A1 | 3/2013 | |
| EP | 2253860 B1 | 9/2014 | |
| EP | 1768001 B1 | 12/2014 | |
| FR | 344324 A * | 10/1904 | ............ B21D 19/12 |
| GB | 1586027 A | 3/1981 | |
| GB | 2135163 A | 8/1984 | |
| JP | 2003028145 A1 | 1/2003 | |
| JP | 4350375 B2 | 10/2009 | |
| WO | 02073051 A2 | 9/2002 | |
| WO | 2010059910 A1 | 5/2010 | |
| WO | 2010104820 A2 | 9/2010 | |
| WO | 2011075622 A1 | 6/2011 | |

* cited by examiner

PLAIN BEARING

CROSS-REFERENCE TO RELATED APPLICATION(S)

This application claims priority under 35 U.S.C. § 119(e) to U.S. Patent Application No. 62/186,903 entitled "PLAIN BEARING," by Alan F. Hunter, Zbigniew M. Koziol and Nicholas F. Witting, filed Jun. 30, 2015, which is assigned to the current assignee hereof and incorporated herein by reference in its entirety.

FIELD OF THE DISCLOSURE

The present disclosure is directed to a bearing, and more particularly to a plain bearing having a curved portion at an axial end thereof.

RELATED ART

Bearings generally provide a low friction slip interface between mated components. At a basic level, a bearing can include a low friction material interfacing between two or more components which are movable with respect to one another. The low friction material can have a relatively low coefficient of friction, thus facilitating easier movement between the two or more movable components. Plain bearings typically include a low friction, or low friction containing, material and include a bearing surface having no rolling elements. In this regard, they are simple and cost effective to produce.

Industries which require the use of bearings continue to demand improved bearings capable of performing in improved ways.

BRIEF DESCRIPTION OF THE DRAWINGS

Embodiments are illustrated by way of example and are not intended to be limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing arts.

Generally, a bearing in accordance with one or more embodiments described herein can include a generally cylindrical sidewall and a curved portion disposed at an axial end of the generally cylindrical sidewall. In an embodiment, the curved portion may extend from, and even be contiguous with, the generally cylindrical sidewall. The curved portion can extend both axially and radially from the generally cylindrical sidewall. In an embodiment, the curved portion may form a radially outermost and axially uppermost location of the bearing.

Bearings having curved portions as described in certain embodiments herein may provide one or more advantages which will become clear after reading the entire specification.

Figure 1:
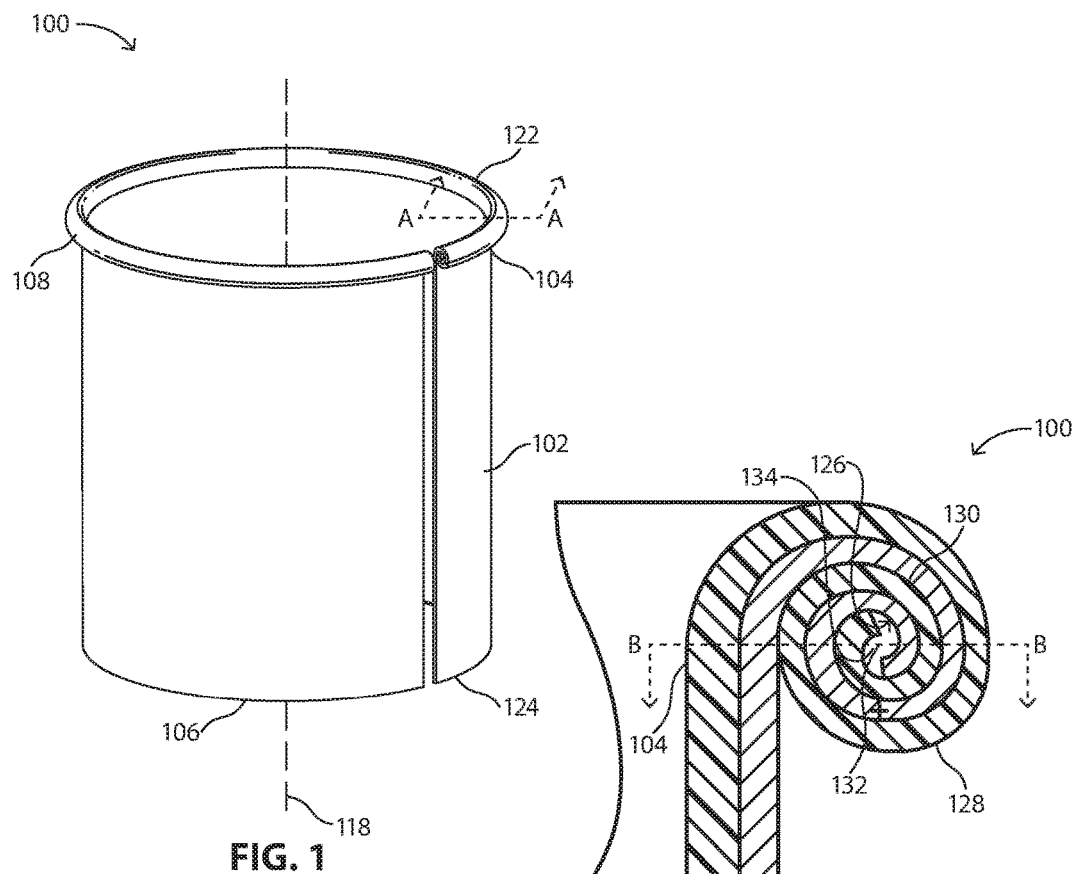
FIG. 1 includes a perspective view of a bearing in accordance with an embodiment.

Referring to FIG. 1, a bearing 100 can include a generally cylindrical sidewall 102 having a first axial end 104 and a second axial end 106 spaced apart by an axial length of the generally cylindrical sidewall 102, and a curved portion 108 extending from the generally cylindrical sidewall 102. As used herein, "generally cylindrical" refers to shape which, when positioned in a best fit cylinder having a body of revolution about an axis, deviates from the best fit cylinder by no greater than 15% at any location, no greater than 10% at any location, no greater than 5% at any location, no greater than 4% at any location, no greater than 3% at any location, no greater than 2% at any location, or no greater than 1% at any location. In an embodiment, "generally cylindrical" may refer to the generally cylindrical sidewall 102 as assembled between inner and outer components—i.e., in the installed state. In another embodiment, "generally cylindrical" may refer to the generally cylindrical sidewall 102 prior to assembly between inner and outer components—i.e., in the uninstalled state. In a particular embodiment, the generally cylindrical sidewall may be a cylindrical sidewall having a shape corresponding to a revolution about an axis with two longitudinal planar end sections. In a particular embodiment, the cylindrical sidewall may have a nominal surface roughness, such as for example, caused during typical machining and fabrication processes.

In an embodiment, the curved portion 108 may extend from the first axial end 104 of the generally cylindrical sidewall 102. In a particular instance, the curved portion 108 may extend both axially and radially from the generally cylindrical sidewall 102. In an embodiment, the curved portion 108 may be contiguous with the generally cylindrical sidewall 102. In a more particular embodiment, the curved portion 108 may be continuous with the generally cylindrical sidewall 102. In yet a further embodiment, the bearing 100 may have a unitary construction such that the curved portion 108 and the generally cylindrical sidewall 102 are formed from a single piece of continuous material.

In an embodiment, the curved portion 108 may have an innermost diameter—typically at, or adjacent, the junction between the curved portion 108 and the generally cylindrical sidewall 102, and an outermost diameter as visible from a central axis 118 of the bearing 100, where the outermost diameter is at least 101% the innermost diameter, at least 102% the innermost diameter, at least 103% the innermost diameter, at least 104% the innermost diameter, or at least 105% the innermost diameter. The outermost diameter visible from the central axis is the maximum diameter at such point where an inner surface 114 (FIG. 2) of the curved portion 108 is visible in elevation view from the central axis 118.

In an embodiment, the bearing 100 can have a laminate structure. More particularly, referring to FIG. 2, the bearing 100 may include a substrate 110 coupled with a low friction material 112.

The low friction material 112 may be selected to have a dynamic coefficient of friction, as measured against a dry steel surface, of less than 0.7, less than 0.65, less than 0.6, less than 0.55, less than 0.5, less than 0.45, less than 0.4, less than 0.35, less than 0.3, less than 0.25, less than 0.2, less than 0.15, or less than 0.1. In an embodiment, the low friction material 112 can have a dynamic coefficient of friction greater than 0.01.

In an embodiment, the low friction material 112 may be non-conductive or formed from a material that has generally non-conductive properties. In certain applications, such as vehicle door hinge assemblies, the bearing 100 may be subjected to surface treatments and painting. Such surface treatment and painting can utilize conductive or electrostatic fluids attracted to charged surfaces. As the bearing generally rotates as part of the door hinge assembly, any dried fluid on the bearing may chip or flake during door rotation, creating micro- and macroscopic particles which, if airborne, might land on other surfaces being treated, potentially damaging the surface treatment. Use of a non-conductive low friction material 112 may mitigate such damage as only the curved portion 108 of the bearing 100 is exposed from the assembly (e.g., vehicle door hinge) and the outermost surface of the curved portion 108 may be formed exclusively by the low friction material 112.

In another embodiment, the low friction material 112 can include a polymer, glass, ceramic, metal, alloy, or combination thereof. Exemplary polymers include a polyketone, a polyaramid, a polyimide, a polytherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, or any combination thereof. In a particular embodiment, the low friction material 112 includes a fluoropolymer. Exemplary fluoropolymers include fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. Fluoropolymers are used according to particular embodiments. In a particular embodiment, the low friction material 112 can include Rulon® or Rulon® LR, as sold by Saint-Gobain, Inc. In another particular embodiment, the low friction material 112 can include Ekonol®, as sold by Saint-Gobain, Inc.

Additionally, the bearing 100 can include lubrication. Exemplary lubricants include molybdenum disulfide, tungsten disulfide, graphite, grapheme, expanded graphite, boron nitrade, talc, calcium fluoride, or any combination thereof. Additionally, the lubricant can include alumina, silica, titanium dioxide, calcium fluoride, boron nitride, mica, Wollastonite, silicon carbide, silicon nitride, zirconia, carbon black, pigments, or any combination thereof.

In an embodiment, the substrate 110 can include a metal, ceramic, or polymer. In a more particular embodiment, the substrate 110 may include steel, such as 1008 steel. In a particular instance, the substrate 110 may include a relatively flexible material (e.g., having an elastic modulus of less than 250 MPa, less than 200 MPa, or less than 150 MPa). In a particular instance, a substrate 110 formed from a relatively flexible material may facilitate easier formation of the curved portion 108.

In an embodiment, the low friction material 112 may be disposed radially inside of the substrate 110 so as to form a low friction inner surface 114 of the bearing 100. In an embodiment, the low friction material 112 may terminate, along with the substrate 110, at the second axial end 106 of the bearing 100 such that both the low friction material 112 and substrate 110 are visible when viewed in a direction parallel to a central axis 118 (FIG. 1) of the bearing 100. In another embodiment, either one of the substrate 110 or low friction material 112 may at least partially wrap around the other of the substrate 110 or low friction material 112 such that only one of the substrate 110 and low friction material 112 is visible when viewed from the second axial end 106 in a direction parallel to the central axis 118.

In an embodiment, the substrate 110 may be exposed along at least a portion of an outer surface 116 of the generally cylindrical sidewall 102. That is, the substrate 110 may be visible along the outer surface 116 as viewed in a side elevation view. In a further embodiment, the substrate 110 may be exposed along the entire outer surface 116 of the generally cylindrical sidewall 102. That is, the outer surface 116 may be formed from the substrate 110. In a more particular embodiment, the low friction material 112 may not be visible along the generally cylindrical sidewall 102 when viewed from an external position in a side elevation view. In another embodiment, a further layer (not illustrated) may be disposed on the substrate 102 to form the outer surface 116. The further layer may, for example, reduce corrosion or decrease frictional coefficients of the outer surface 116.

The generally cylindrical sidewall 102 may have a thickness, $T_{SW}$, as measured in a radial direction from the central axis 118. In an embodiment, $T_{SW}$ may be at least 0.01 mm, at least 0.1 mm, at least 0.2 mm, at least 0.3 mm, at least 0.4 mm, at least 0.5 mm, at least 0.6 mm, at least 0.7 mm, at least 0.8 mm, at least 0.9 mm, at least 1.0 mm, at least 1.1 mm, at least 1.2 mm, at least 1.3 mm, at least 1.4 mm, or at least 1.5 mm. In another embodiment, $T_{SW}$ may be no greater than 10 mm, no greater than 9 mm, no greater than 8 mm, no greater than 7 mm, no greater than 6 mm, no greater than 5 mm, no greater than 4 mm, no greater than 3 mm, or no greater than 2 mm. The thickness, $T_{SW}$, may include a thickness of the substrate, $T_S$, and a thickness of the low friction material, $T_{LFM}$. In a particular instance, $T_S$ may be greater than $T_{LFM}$. For example, $T_S$ may be at least 1.01 $T_{LFM}$, at least 1.02 $T_{LFM}$, at least 1.03 $T_{LFM}$, at least 1.04 $T_{LFM}$, at least 1.05 $T_{LFM}$, at least 1.1 $T_{LFM}$, at least 1.2 $T_{LFM}$, at least 1.3 $T_{LFM}$, at least 1.4 $T_{LFM}$, at least 1.5 $T_{LFM}$, or at least 2.0 $T_{LFM}$. In a more particular embodiment, $T_S$ may be no greater than 25 $T_{LFM}$, no greater than 10 $T_{LFM}$, or no greater than 5 $T_{LFM}$. In another particular instance, $T_S$ may be less than $T_{LFM}$. For example, $T_{LFM}$ may be at least 1.01 $T_S$, at least 1.02 $T_S$, at least 1.03 $T_S$, at least 1.04 $T_S$, at least 1.05 $T_S$, at least 1.1 $T_S$, at least 1.2 $T_S$, at least 1.3 $T_S$, at least 1.4 $T_S$, at least 1.5 $T_S$, or at least 2.0 $T_S$. In a more particular embodiment, $T_{LFM}$ may be no greater than 25 $T_S$, no greater than 10 $T_S$, or no greater than 5 $T_S$.

In an embodiment, an axial length, $L_{SW}$, of the generally cylindrical sidewall 102, as measured in a direction parallel with the central axis 118 may be no less than 25% of a diameter of the generally cylindrical sidewall 102, no less than 50% of the diameter of the generally cylindrical sidewall 102, no less than 75% of the diameter of the generally cylindrical sidewall 102, no less than 100% of the diameter of the generally cylindrical sidewall 102, no less than 125% of the diameter of the generally cylindrical sidewall 102, no less than 150% of the diameter of the generally cylindrical sidewall 102, no less than 175% of the diameter of the generally cylindrical sidewall 102, no less than 200% of the diameter of the generally cylindrical sidewall 102, no less than 225% of the diameter of the generally cylindrical sidewall 102, no less than 250% of the diameter of the generally cylindrical sidewall 102, no less than 275% of the diameter of the generally cylindrical sidewall 102, no less than 300% of the diameter of the generally cylindrical sidewall 102, or no less than 325% of the diameter of the generally cylindrical sidewall 102. In another embodiment, LSW may be no greater than 5000% the diameter of the generally cylindrical sidewall 102, no greater than 1000% the diameter of the generally cylindrical sidewall 102, or no greater than 500% the diameter of the generally cylindrical sidewall 102.

In an embodiment, the inner surface 114 of the bearing 100 may have a uniform inner diameter as measured along the axial length of the generally cylindrical sidewall 102. In another embodiment, the inner surface 114 can have a non-uniform diameter, as measured along the axial length of the generally cylindrical sidewall 102. That is, the inner diameter of the generally cylindrical sidewall 102 may vary. In a particular embodiment, an innermost diameter of the bearing 100 may be located at a position between the first and second axial ends 104 and 106 of the generally cylindrical sidewall 102.

The inner surface 114 may provide a contact interface with an inner component, such as for example, a shaft or rod, extending through the bearing 100. In an embodiment, the generally cylindrical sidewall 102 may deform—elastically or plastically—upon receiving the inner component, such that the effective in-use diameter of the inner surface 114 is different than the pre-assembled diameter. In a particular embodiment, the inner surface 114 may have a first shape in the pre-assembled state (i.e., prior to assembly with the inner component) and a second shape in the in-use state (i.e., after assembly with the inner component) different from the first shape.

Referring again to FIG. 1, in an embodiment the bearing 100 can further include a gap 120 extending at least partially between the first and second axial ends 104 and 106 of the generally cylindrical sidewall 102. In a more particular embodiment, the gap 120 may extend along the entire axial length of the generally cylindrical sidewall 102. In yet a more particular embodiment, the gap 120 may extend between a first axial end 122 and a second axial end 124 of the bearing 100. It is noted that in certain embodiments, the second axial end 124 may correspond to the second axial end 106 of the generally cylindrical sidewall 100.

Figure 2:
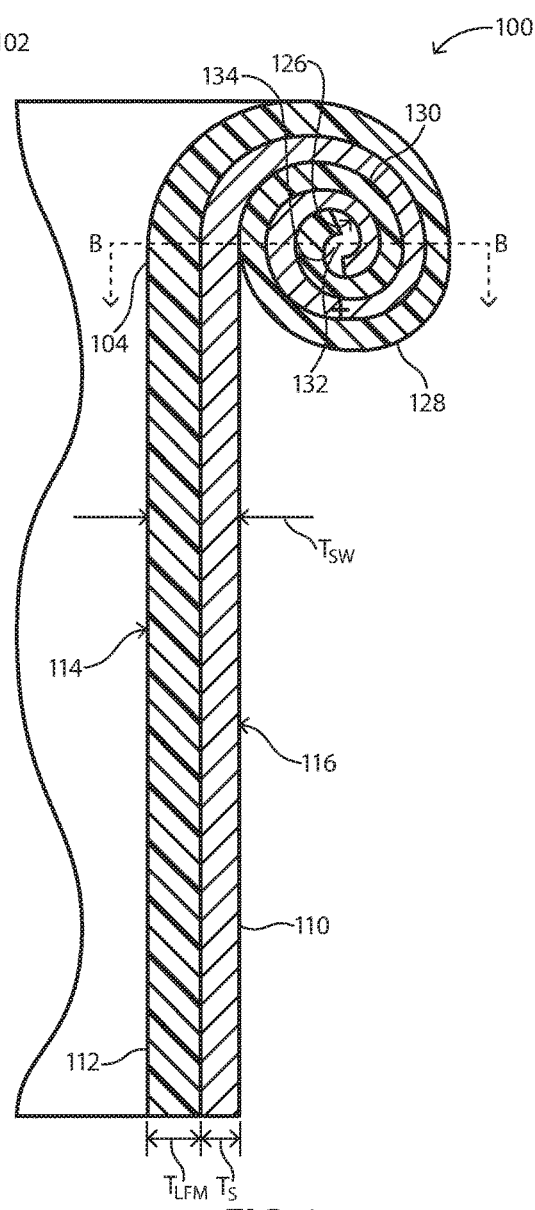
FIG. 2 includes a cross-sectional side elevation view of the bearing in accordance with an embodiment, as viewed along Line A-A in FIG. 1.

In an embodiment, the curved portion 108 of the bearing 100 may include a plurality of rolls or generally concentric layers. For example, as illustrated in FIG. 2, the curved portion 108 may include a two-ply thickness. That is, the curved portion 108 may include two rolls 128 and 130 generally coaxial with respect to one another. In an embodiment, the rolls 128 and 130 may extend around, or generally around, a central focus 132 of the curved portion 108. In further embodiments, the curved portion 108 may include at least three rolls, at least four rolls, at least five rolls, or at least six rolls. The number of rolls may be limited by material selection and thickness. Generally, the more brittle or less flexible the material, the fewer the number of rolls that may be included in the curved portion 108. Similarly, as material thickness increases, the number of rolls generally decreases. Bearings 100 in accordance with embodiments described herein may have as many as 10, 25, or even 50 rolls.

In certain embodiments, an innermost surface 126 of the curved portion 108 may have a generally arcuate cross-sectional profile as viewed in elevation view. In a particular embodiment, the innermost surface 126 may be ellipsoidal or include ellipsoidal portions. In yet another embodiment, the innermost surface 126 may be generally circular or ovular.

In an embodiment, the curved portion 108 may define a cavity 134 extending at least partially around a circumference of the bearing 100. The cavity 134 may be defined by the innermost surface 126 of the curved portion 108. In another embodiment, the cavity 134 may extend around a majority of the circumference of the bearing 100. In yet a further embodiment, the cavity 134 may extend around the entire circumference of the bearing 100. In an embodiment, the cavity 134 may have an ellipsoidal cross-sectional profile, as viewed prior to assembly with external components. In an embodiment, the cavity 134 may define a generally toroidal space. In a further embodiment, the cavity 134 may define a toroidal space. As used herein, a "generally toroidal space" refers to a space that deviates from a best fit toroidal shape by no greater than 5% at any given location, no greater than 4% at any given location, no greater than 3% at any given location, no greater than 2% at any given location, or no greater than 1% at any given location.

In an embodiment, the cavity 134 may be defined by the substrate 110. That is, the cavity 134 may be bounded by the substrate 110. As used herein, "bounded by the substrate" refers to a condition where the sidewalls or side surfaces of an object are formed by the substrate. In yet a further embodiment, the cavity 134 may not generally contact the low friction material 112. As used herein, "not generally contact the low friction material" refers to contact of less than 1 $cm^3$, less than 0.5 $cm^3$, less than 0.25 $cm^3$, or less than 0.1 cm³. In an embodiment, the cavity 134 may not contact the low friction material 112. In such embodiment, the toroidal space may be fully bounded by the substrate 110 and not the low friction material 112.

Figure 3:
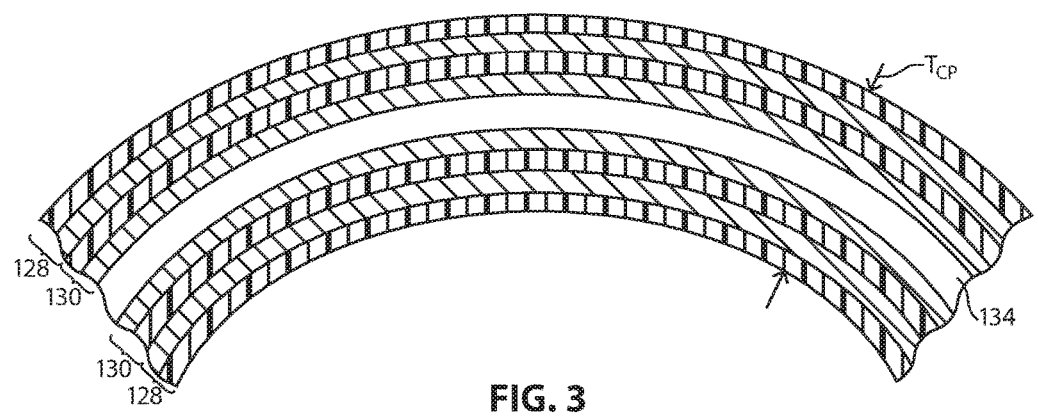
FIG. 3 includes a cross-sectional top elevation view of the bearing in accordance with an embodiment, as viewed along Line B-B in FIG. 2

Referring to FIG. 3, the curved portion 108 of the bearing 100 can have an effective material thickness, $T_{CP}$, as measured in a radial direction from the central axis 118 (FIG. 1), greater than the thickness of the generally cylindrical sidewall, $T_{SW}$. For example, in an embodiment, $T_{CP}$ may be at least 101% $T_{SW}$, at least 102% $T_{SW}$, at least 103% $T_{SW}$, at least 104% $T_{SW}$, at least 105% $T_{SW}$, at least 110% $T_{SW}$, at least 120% $T_{SW}$, at least 130% $T_{SW}$, at least 140% $T_{SW}$, at least 150% $T_{SW}$, at least 200% $T_{SW}$, at least 300% $T_{SW}$, at least 400% $T_{SW}$, or at least 500% $T_{SW}$. In an embodiment, $T_{CP}$ may be no greater than 5000% $T_{SW}$, or no greater than 1000% $T_{SW}$. As used herein, "effective thickness" refers to a maximum radial thickness of the curved portion as measured prior to installation—i.e., prior to deformation caused by loading forces during installation, in a direction perpendicular to the central axis 118. The effective thickness includes the thickness of the material within the curved portion in addition to the diameter of the cavity 134. Typically, the effective thickness of the curved portion 108 extends through, or near, the focus 132 of the cavity 134, however, it is possible that the effective thickness of the curved portion 108 does not extend through, or near, the focus 132 of the cavity 134.

Figure 4:
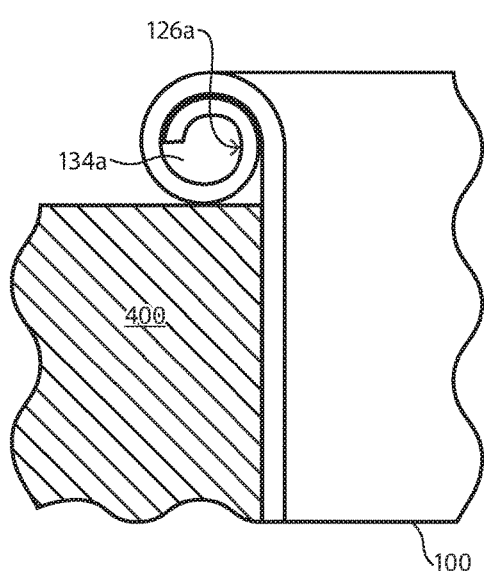
FIG. 4 includes a cross-sectional side elevation view of an assembly in accordance with an embodiment.
Figure 5:
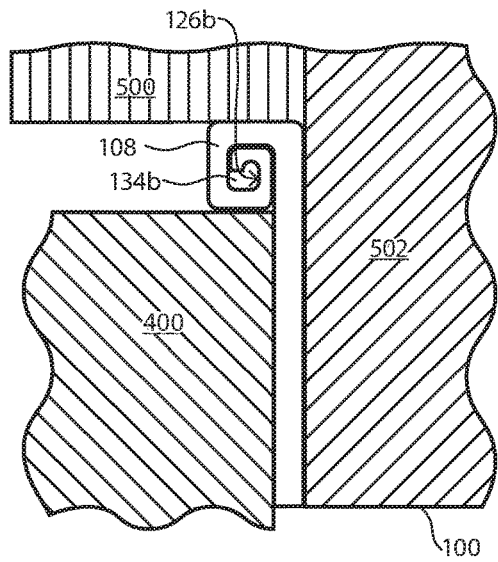
FIG. 5 includes a cross-sectional side elevation view of an assembly in accordance with an embodiment.

In an embodiment, the cavity 134 may have an initial shape as seen prior to assembly, and an assembled shape as seen after assembly, where the assembled shape is different than the initial shape. Referring to FIGS. 4 and 5, the initial shape of the cavity 134a may be generally circular (FIG. 4) while the assembled shape of the cavity 134b, as viewed after assembly, may be more polygonal (FIG. 5). That is, the initial, innermost surface 126a may be generally rounded, while the assembled, innermost surface 126b may have flattened, or generally flattened portions. The innermost surface 126b is exaggerated in FIG. 5 to have significantly flattened portions beyond what might occur during actual assembly. That is, the actual profile of the innermost surface 126b may vary from that illustrated, but may generally have less arcuate profiles.

During assembly the bearing 100 may be positioned within an outer component 400 (FIG. 4). In an embodiment, an inner component (e.g., a shaft or rod) 502 may be inserted at least partially into the bearing 100 and an axial component 500 may be position around the inner component 502 such that the axial component 500 contacts the curved portion 108. In another embodiment, the axial component 500 may be positioned relative to the curved portion 108 without inclusion of an inner component 502.

In particular assemblies, such as the assembly illustrated in FIG. 5, the curved portion 108 may absorb tolerance and misalignment between components in axial alignment. In an embodiment, the curved portion 108 may absorb axial misalignment, for example, by collapsing or crushing while maintaining an axial spacing between components (e.g., outer component 400 and axial component 500. Collapsing may occur at the cavity 134 which may reduce in volume and axial height.

In an embodiment, the cavity 134 may have a first volume, as measured prior to assembly, and a second volume, as measured after assembly, where the first and second volumes are different from one another. In a particular embodiment, the first volume may be greater than the second volume. In a particular embodiment, the first volume may be at least 0.1 cm³, at least 0.2 cm³, at least 0.3 cm³, at least 0.4 cm³, at least 0.5 cm³, at least 1 cm³, or at least 2 cm³. In a further embodiment, the first volume may be no greater than 1,000 cm³, no greater than 500 cm³, no greater than 100 cm³, or no greater than 10 cm³.

In a particular embodiment, the cavity 134 may be airtight. In such a manner, external fluid, including both liquid and gas, may be not penetrate into the cavity 134. This may be achieved, for example, by sealing the cavity 134 with a sealing agent or material. In a particular embodiment, the cavity 134 may be self-sealing. That is, the cavity 134 may be sealed during formation of the curved portion 108. In an embodiment, forces acting on the curved portion 108 during fabrication may effectively seal the cavity 134.

In an embodiment, the cavity 134 may have an internal pressure, $P_I$, equal to an external pressure, $P_E$, outside of the cavity 134. In another embodiment, $P_I$ may be greater than $P_E$. For example, $P_I$ may be greater than 1.01 $P_E$, greater than 1.05 $P_E$, or greater than 1.1 $P_E$. In a further embodiment, $P_I$ may be less than $P_E$. For example, $P_I$ may be less than 0.99 $P_E$, less than 0.95 $P_E$, or less than 0.9 $P_E$. The internal pressure, $P_I$, of the cavity 134 may be modified for specific applications. That is, $P_I$ may be greater than $P_E$ for use with heavy components, where the axial component 500 might impart significant weight (e.g., 10,000N) on the curved portion 108.

In an embodiment, an initial height of the curved portion 108, as measured in an axial direction prior to assembly, may be greater than an assembled height of the curved portion 108, as measured in an axial direction after assembly. For example, the assembled height may be no greater than 99% the initial height, no greater than 98% the initial height, no greater than 97% the initial height, no greater than 96% the initial height, no greater than 95% the initial height, no greater than 90% the initial height, no greater than 75% the initial height, or no greater than 50% the initial height. In another embodiment, the assembled height may be no less than 10% the initial height. That is, the curved portion 108 may not collapse by more than 90% as compared between pre- and post-installation.

Figure 6:
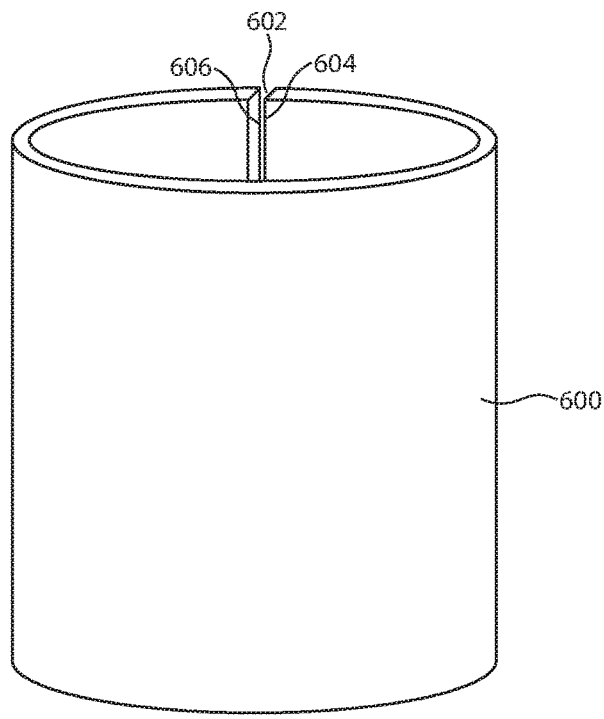
FIG. 6 includes a perspective view of a generally cylindrical sidewall prior to formation of a curved portion of the bearing in accordance with an embodiment.

Referring to FIG. 6, in an embodiment, the bearing 100 may be formed from a sheet of material shaped into a generally cylindrical sidewall 600. The material may be laminated to include a substrate and a low friction material. Shaping of the generally cylindrical sidewall 600 may occur by brining two opposite edges 604 and 606 of the material toward one another. The generally cylindrical sidewall 600 may include a gap 602 extending along the axial length of the generally cylindrical sidewall 600. The gap 602 may be welded or left open prior to formation of the curved portion. In an embodiment, the gap 602 may be welded closed before formation of the curved portion. In another embodiment, the gap 602 may be welded closed after formation of the curved portion.

Figure 7:
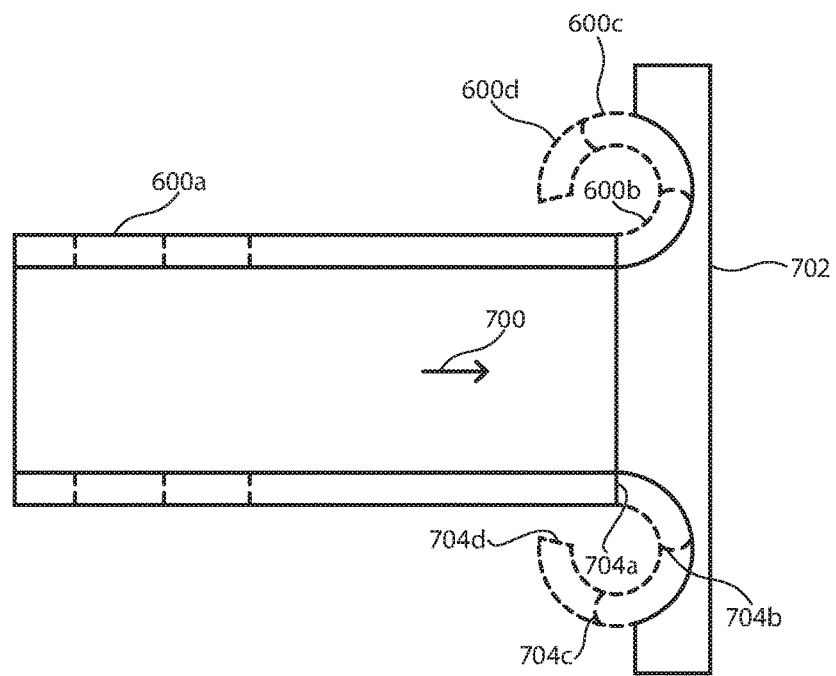
FIG. 7 includes a cross-sectional side elevation view of the generally cylindrical sidewall being urged toward a die to form the curved portion of the bearing in accordance with an embodiment.

Referring to FIG. 7, after formation of the generally cylindrical sidewall 600, the curved portion may be formed by urging the generally cylindrical sidewall 600 in a direction indicated by arrow 700 toward an element, such as a die 702. An axial end 704a of the generally cylindrical sidewall 600 may first contact the die 702 at a curved portion 704, causing the axial end 704a to bend (illustrated by dashed lines 704b, 704c, and 704d). The generally cylindrical sidewall 600 can be urged toward the die 702 until sufficient formation of a suitable curved portion. Additionally rolls may be formed, for example, by rolling additional length of the generally cylindrical sidewall 600 into the die 702.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A plain bearing comprising:
a generally cylindrical sidewall having a first axial end and a second axial end; and
a curved portion disposed at the first axial end,
wherein the generally cylindrical sidewall has a thickness, wherein the curved portion has an effective material thickness, wherein the effective material thickness of the curved portion is n-times thicker than the thickness of the generally cylindrical sidewall, and wherein n equals 2, 3, 4, or even 5.

Embodiment 2

A plain bearing comprising:
a generally cylindrical sidewall; and
a curved portion contiguous with and extending from an axial end of the generally cylindrical sidewall,
wherein the plain bearing comprises a substrate and a low friction material, and wherein the low friction material is disposed at a radially innermost, an axially uppermost, and a radially outermost location of the bearing.

Embodiment 3

A plain bearing comprising:
a generally cylindrical sidewall; and
a curved portion contiguous with an extending from an axial end of the generally cylindrical sidewall,
wherein:
the bearing comprises a low friction material and a substrate,
the substrate is exposed along a radially outer surface of the generally cylindrical sidewall, and
the substrate is not visible along the curved portion.

Embodiment 4

A plain bearing comprising a curved portion at an axial end, the curved portion having at least 2 rolls, such as at least 3 rolls, at least 4 rolls, or even at least 5 rolls.

Embodiment 5

A plain bearing comprising:
a generally cylindrical sidewall; and
a curved portion contiguous with and extending from an axial end of the generally cylindrical sidewall, wherein the curved portion has at least two tangent lines, when viewed in cross section, parallel to the generally cylindrical sidewall.

Embodiment 6

A plain bearing comprising:
a generally cylindrical sidewall; and
a curved portion contiguous with and extending from an axial end of the generally cylindrical sidewall, the curved portion having an axial height, as measured parallel to a central axis of the bearing, wherein the curved portion is adapted to space apart two components by a distance corresponding to the axial height.

Embodiment 7

A plain bearing comprising:
a generally cylindrical sidewall; and
a curved portion contiguous with an extending from an axial end of the generally cylindrical sidewall, wherein the curved portion is adapted to deform in a direction parallel to a central axis of the bearing upon axial loading so as to absorb misalignment between two axially aligned component.

Embodiment 8

An assembly comprising:
an outer component having a bore;
an inner component disposed within the bore;
a plain bearing at least partially disposed between the inner and outer components, the plain bearing comprising:
a generally cylindrical sidewall; and
a curved portion contiguous with and extending from an axial end of the generally cylindrical sidewall,
wherein the curved portion has an axial height, as measured parallel to a central axis of the bearing; and
an axial component at least partially supported by the plain bearing and disposed a distance from the outer component, the distance corresponding to the axial height of the curved portion.

Embodiment 9

The plain bearing or assembly of any one of the preceding embodiments, wherein the plain bearing comprises a generally cylindrical sidewall having a first axial end and a second axial end.

Embodiment 10

The plain bearing or assembly of embodiment 9, wherein the generally cylindrical sidewall has a thickness, wherein the curved portion has an effective material thickness, and wherein the effective material thickness is greater than the thickness of the generally cylindrical sidewall.

Embodiment 11

The plain bearing or assembly of embodiment 10, wherein the effective thickness is at least 101% the thickness of the generally cylindrical sidewall, at least 150% the thickness of the generally cylindrical sidewall, at least 200% the thickness of the generally cylindrical sidewall, or at least 500% the thickness of the generally cylindrical sidewall.

Embodiment 12

The plain bearing or assembly of any one of embodiments 9-11, wherein the generally cylindrical sidewall comprises a substrate and a low friction material.

Embodiment 13

The plain bearing or assembly of embodiment 12, wherein the low friction material is laminated to a surface of the substrate.

Embodiment 14

The plain bearing or assembly of any one of embodiments 12 and 13, wherein the low friction material is laminated to a radially inner surface of the substrate.

Embodiment 15

The plain bearing or assembly of any one of embodiments 12-14, wherein the substrate comprises a metal, wherein the substrate comprises steel, wherein the substrate comprises 1008 steel.

Embodiment 16

The plain bearing or assembly of any one of embodiments 12-15, wherein the low friction material has a static coefficient of friction, as measured against a dry steel surface, of less than 0.9, less than 0.85, less than 0.8, less than 0.75, less than 0.7, less than 0.65, less than 0.6, less than 0.55, less than 0.5, less than 0.45, less than 0.4, less than 0.35, less than 0.3, less than 0.25, or less than 0.2.

Embodiment 17

The plain bearing or assembly of any one of embodiments 12-16, wherein the low friction material comprises a polymer, wherein the low friction material comprises a PTFE, wherein the low friction material comprises a glass-containing material, wherein the low friction material comprises a non-conductive material, wherein the low friction material comprises Ekonol, wherein the low friction material comprises Rulon®, wherein the low friction material comprises Rulon® LR.

Embodiment 18

The plain bearing or assembly of any one of embodiments 12-17, wherein the low friction material of the generally cylindrical sidewall is not visible from an external position, as viewed in side elevation.

Embodiment 19

The plain bearing or assembly of any one of embodiments 12-18, wherein the substrate is visible from an external position, as viewed in side elevation.

Embodiment 20

The plain bearing or assembly of any one of embodiments 9-19, wherein the generally cylindrical sidewall has a thickness, as measured in a radial direction, of at least 0.1 mm, at least 0.2 mm, at least 0.3 mm, at least 0.4 mm, at least 0.5 mm, at least 0.6 mm, at least 0.7 mm, at least 0.8 mm, at least 0.9 mm, at least 1.0 mm, or at least 1.5 mm

Embodiment 21

The plain bearing or assembly of any one of embodiments 9-20, wherein the generally cylindrical sidewall has a thickness, as measured in a radial direction, of no greater than 10 mm, no greater than 5 mm, no greater than 4 mm, no greater than 3 mm, or no greater than 2 mm.

Embodiment 22

The plain bearing or assembly of any one of embodiments 9-21, wherein the first and second axial ends of the generally cylindrical sidewall are spaced apart by an axial length of the generally cylindrical sidewall, and wherein the axial length of the generally cylindrical sidewall is no less than 25% a diameter of the generally cylindrical sidewall, no less than 50% of the diameter of the generally cylindrical sidewall, no less than 75% of the diameter of the generally cylindrical sidewall, no less than 100% of the diameter of the generally cylindrical sidewall, no less than 150% of the diameter of the generally cylindrical sidewall, no less than 200% of the diameter of the generally cylindrical sidewall, or no less than 500% of the diameter of the generally cylindrical sidewall.

Embodiment 23

The plain bearing or assembly of any one of embodiments 9-22, wherein the generally cylindrical sidewall is contiguous with the curved portion.

Embodiment 24

The plain bearing or assembly of any one of embodiments 9-23, wherein the curved portion is contiguous with the first axial end of the generally cylindrical sidewall.

Embodiment 25

The plain bearing or assembly of any one of embodiments 9-24, wherein an innermost diameter of the bearing is located at a position between the first and second axial ends of the generally cylindrical sidewall.

Embodiment 26

The plain bearing or assembly of any one of embodiments 9-25, wherein an inner diameter of the generally cylindrical sidewall is uniform as measured along an axial length of the generally cylindrical sidewall.

Embodiment 27

The plain bearing or assembly of any one of embodiments 9-25, wherein an inner diameter of the generally cylindrical sidewall varies as measured along an axial length of the generally cylindrical sidewall.

Embodiment 28

The plain bearing or assembly of any one of embodiments 9-27, wherein the second axial end of the generally cylindrical sidewall is coincident with a second axial end of the bearing.

Embodiment 29

The plain bearing or assembly of any one of embodiments 9-28, wherein the generally cylindrical sidewall comprises a gap extending at least partially between the first and second axial ends.

Embodiment 30

The plain bearing or assembly of embodiment 29, wherein the gap extends entirely from the first axial end to the second axial end.

Embodiment 31

The plain bearing or assembly of any one of embodiments 9-30, wherein the generally cylindrical sidewall is cylindrical.

Embodiment 32

The plain bearing or assembly of any one of the preceding embodiments, wherein the curved portion is disposed at the first axial end of the generally cylindrical bearing.

Embodiment 33

The plain bearing or assembly of embodiment 32, wherein a portion of the curved portion is coincident with a first axial end of the bearing.

Embodiment 34

The plain bearing or assembly of any one of embodiments 32 and 33, wherein the curved portion has an axial height, as measured in a direction parallel to a central axis of the bearing, and wherein the axial height of the curved portion is less than an axial length of the generally cylindrical sidewall.

Embodiment 35

The plain bearing or assembly of any one of embodiments 32-34, wherein the curved portion has an axial length that is no greater than 100% an axial length of the generally cylindrical sidewall, no greater than 90% the axial length of the generally cylindrical sidewall, no greater than 80% the axial length of the generally cylindrical sidewall, no greater than 70% the axial length of the generally cylindrical sidewall, no greater than 60% the axial length of the generally cylindrical sidewall, no greater than 50% the axial length of the generally cylindrical sidewall, no greater than 40% the axial length of the generally cylindrical sidewall, no greater than 30% the axial length of the generally cylindrical sidewall, no greater than 20% the axial length of the generally cylindrical sidewall, or no greater than 10% the axial length of the generally cylindrical sidewall.

Embodiment 36

The plain bearing or assembly of any one of embodiments 32-35, wherein, as viewed in a cross-sectional elevation view, the curved portion has a generally arcuate innermost surface.

Embodiment 37

The plain bearing or assembly of any one of embodiments 32-36, wherein the curved portion has a plurality of rolls, and wherein at least two of the plurality of rolls are generally coaxial with respect to one another.

Embodiment 38

The plain bearing or assembly of any one of embodiments 32-37, wherein the curved portion has at least 2 rolls, at least 3 rolls, at least 4 rolls, or even at least 5 rolls.

Embodiment 39

The plain bearing or assembly of any one of embodiments 32-38, wherein the curved portion has at least two tangent lines, when viewed in cross section, parallel to the generally cylindrical sidewall.

Embodiment 40

The plain bearing or assembly of any one of embodiments 32-39, wherein the curved portion comprises a substrate and a low friction material, wherein the substrate and the low friction material are laminated together.

Embodiment 41

The plain bearing or assembly of embodiment 40, wherein the low friction material is disposed at an axially uppermost and a radially outermost location of the curved portion.

Embodiment 42

The plain bearing or assembly of any one of embodiments 40 and 41, wherein the low friction material of the curved portion is contiguous with the low friction material of the generally cylindrical sidewall.

Embodiment 43

The plain bearing or assembly of any one of embodiments 40-42, wherein the substrate of the curved portion is contiguous with the substrate of the generally cylindrical sidewall.

Embodiment 44

The plain bearing or assembly of any one of embodiments 32-43, wherein the curved portion defines a cavity extending at least partially around a circumference of the bearing, wherein the curved portion defines a cavity extending around a majority of the circumference of the bearing, wherein the curved portion defines a cavity extending entirely around the circumference of the bearing.

Embodiment 45

The plain bearing or assembly of embodiment 44, wherein the cavity has an ellipsoidal cross-sectional profile, as viewed prior to assembly.

Embodiment 46

The plain bearing or assembly of any one of embodiments 44 and 45, wherein the cavity has an initial shape prior to installation, and an assembled shape after assembly, and wherein the assembled shape is different from the initial shape.

Embodiment 47

The plain bearing or assembly of any one of embodiments 44-46, wherein the cavity defines a first volume prior to assembly and a second volume after assembly, and wherein the first volume is different than the second volume.

Embodiment 48

The plain bearing or assembly of embodiment 47, wherein the first volume is greater than the second volume.

Embodiment 49

The plain bearing or assembly of any one of embodiments 44-48, wherein the cavity is airtight.

Embodiment 50

The plain bearing or assembly of any one of embodiments 44-49, wherein the cavity is defined by the substrate, wherein the cavity is directly bounded by the substrate, wherein the cavity does not contact a low friction material.

Embodiment 51

The plain bearing or assembly of any one of embodiments 44-50, wherein the cavity defines a generally toroidal space, wherein the cavity defines a toroidal space.

Embodiment 52

The plain bearing or assembly of any one of embodiments 44-51, wherein the cavity has an internal pressure equal to an external pressure outside of the cavity, wherein the cavity has an internal pressure greater than an external pressure outside of the cavity, wherein the cavity has an internal pressure less than an external pressure outside of the cavity.

Embodiment 53

The plain bearing or assembly of any one of embodiments 44-52, wherein the cavity is sealed, wherein the cavity is self-sealing.

Embodiment 54

The plain bearing or assembly of any one of embodiments 44-53, wherein the cavity has an initial height, as measured in an axial direction prior to assembly, and an assembled height, as measured in the axial direction after assembly, and wherein the assembled height is less than the initial height, wherein the assembled height is no greater than 99% the initial height, no greater than 98% the initial height, no greater than 97% the initial height, no greater than 96% the initial height, no greater than 95% the initial height, no greater than 90% the initial height, no greater than 75% the initial height, or no greater than 50% the initial height.

Embodiment 55

The plain bearing or assembly of any one of embodiments 44-54, wherein the cavity has an internal volume, as measured prior to installation, of at least 0.1 cm$^3$, at least 0.2 cm$^3$, at least 0.3 cm$^3$, at least 0.4 cm$^3$, at least 0.5 cm$^3$, at least 1 cm$^3$, or at least 2 cm$^3$.

Embodiment 56

The plain bearing or assembly of any one of embodiments 32-55, wherein the curved portion is adapted to deform during assembly so as to absorb tolerance in an assembly.

Embodiment 57

The plain bearing or assembly of any one of the preceding embodiments, wherein the bearing is adapted to be disposed between an inner component and an outer component.

Embodiment 58

The plain bearing of embodiment 57, wherein the inner and outer components are part of a hinge, wherein the hinge is part of a door hinge, wherein the door hinge is part of a vehicle door hinge.

Embodiment 59

A hinge comprising the plain bearing of any one of embodiments 1-7 and 9-58.

Embodiment 60

A door hinge comprising the plain bearing of any one of embodiments 1-7 and 9-58.

Embodiment 61

A vehicle door hinge comprising the plain bearing of any one of embodiments 1-7 and 9-58.

Embodiment 62

A thrust bearing comprising the plain bearing of any one of embodiments 1-7 and 9-58.

Embodiment 63

A method of forming a plain bearing comprising:
providing a sheet of material;
shaping the sheet of material into a generally cylindrical sidewall; and
curving an axial end of the generally cylindrical sidewall to form a curved portion.

Embodiment 64

The method of embodiment 63, wherein curving the axial end is performed by urging the generally cylindrical sidewall in a direction parallel to a central axis of the generally cylindrical sidewall.

Embodiment 65

The method of any one of embodiments 63 and 64, wherein curving the axial end is performed by urging the generally cylindrical sidewall toward a die.

Embodiment 66

The method of embodiment 65, wherein the die comprises a feature having a radius of curvature, and wherein the generally cylindrical sidewall is urged toward the feature.

Embodiment 67

The method of any one of embodiments 63-66, wherein shaping the sheet of material is performed by bringing two opposite edges of the sheet of material toward one another.

Embodiment 68

The method of any one of embodiments 63-67, wherein shaping the sheet of material is performed using a die.

Embodiment 69

The method of any one of embodiments 63-68, wherein curving the axial end is performed after shaping the sheet material into the generally cylindrical sidewall.

Embodiment 70

The method of any one of embodiments 63-69, further comprising:
laminating a substrate and a low friction material together to form a sheet of material.

Embodiment 71

The method of embodiment 70, wherein laminating the substrate and low friction material is performed before providing the sheet of material.

Embodiment 72

The method of any one of embodiments 63-70, wherein shaping the sheet of material into the generally cylindrical sidewall is performed so as to form two axially extending circumferential sides spaced apart by a gap.

Embodiment 73

The method of embodiment 72, further comprising:
welding the circumferential sides together.

Embodiment 74

The method of embodiment 73, wherein welding is performed after curving the axial end.

Embodiment 75

The method of embodiment 73, wherein welding is performed after curving the axial end.

Embodiment 76

A method of using a plain bearing comprising:
providing an inner component, an outer component having a bore, and a plain bearing having a generally cylindrical sidewall and a curved portion contiguous with and extending from the generally cylindrical sidewall;
inserting the plain bearing into the bore of the outer component or installing the inner component into the plain bearing to form a sub-assembly;
installing the sub-assembly with the other of the inner and outer component to create an assembly, wherein the curved portion of the plain bearing extends beyond the bore, and wherein an exposed portion of the curved portion comprises a low friction material; and
installing an axial component with the assembly, the axial component spaced apart from the outer component by an axial height corresponding to an axial height of the curved portion.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A plain bearing comprising:
a cylindrical sidewall having a first axial end and a second axial end; and
a curved portion disposed at the first axial end,
wherein the cylindrical sidewall has a thickness, wherein the curved portion has an effective material thickness, wherein the effective material thickness of the curved portion is n-times thicker than the thickness of the cylindrical sidewall, and wherein n equals 2, 3, 4, or 5, wherein the curved portion comprises a substrate and a low friction material, wherein the curved portion defines a cavity extending at least partially around the circumference of the plain bearing, and wherein the cavity is fully bounded by the substrate.

2. The plain bearing of claim 1, wherein the cylindrical sidewall comprises a gap extending at least partially between the first and second axial ends.

3. The plain bearing of claim 1, wherein the curved portion has a plurality of rolls, and wherein at least two of the plurality of rolls are coaxial with respect to one another.

4. The plain bearing of claim 1, wherein the curved portion has at least two tangent lines, when viewed in cross section, parallel to the cylindrical sidewall.

5. The plain bearing of claim 1, wherein the cavity has an assembled shape after assembly.

6. The plain bearing of claim 1, wherein the cavity defines a second volume after assembly.

7. The plain bearing of claim 1, wherein the cylindrical sidewall comprises a substrate and a low friction material.

8. A plain bearing comprising:
- a cylindrical sidewall; and
- a curved portion contiguous with an extending from an axial end of the cylindrical sidewall, wherein:
- the bearing comprises a low friction material and a substrate,
- the substrate is exposed along a radially outer surface of the cylindrical sidewall, and
- the substrate is not visible along the curved portion, wherein the curved portion has an effective material thickness, wherein the effective material thickness of the curved portion is n-times thicker than the thickness of the cylindrical sidewall, and wherein n equals 2, 3, 4, or 5, wherein the curved portion comprises the substrate and the low friction material, wherein the curved portion defines a cavity extending at least partially around the circumference of the plain bearing, and wherein the cavity is fully bounded by the substrate.

9. The plain bearing of claim 8, wherein the cylindrical sidewall comprises a gap extending at least partially between the first and second axial ends.

10. The plain bearing of claim 8, wherein, as viewed in a cross-sectional elevation view, the curved portion has a arcuate innermost surface.

11. The plain bearing of claim 8, wherein the curved portion has at least 3 rolls.

12. The plain bearing of claim 8, wherein the curved portion has a plurality of rolls, and wherein at least two of the plurality of rolls are coaxial with respect to one another.

13. The plain bearing of claim 8, wherein the curved portion has at least two tangent lines, when viewed in cross section, parallel to the cylindrical sidewall.

* * * * *

UNITED STATES PATENT AND TRADEMARK OFFICE
CERTIFICATE OF CORRECTION

PATENT NO. : 10,087,984 B2
APPLICATION NO. : 15/193703
DATED : October 2, 2018
INVENTOR(S) : Alan F. Hunter It is certified that error appears in the above-identified patent and that said Letters Patent is hereby corrected as shown below:

On the Title Page

Page 3, Column 2 Line 8, under "U.S. PATENT DOCUMENTS", please delete "3,012,538" and insert therefor --6,012,538--.

Signed and Sealed this
Twenty-sixth Day of March, 2019

Andrei Iancu
*Director of the United States Patent and Trademark Office*